(12) United States Patent
Johnson et al.

(10) Patent No.: US 6,824,001 B2
(45) Date of Patent: Nov. 30, 2004

(54) SHRINK SLEEVED BOTTLE

(75) Inventors: Karen Amanda Johnson, Brussels (BE); Alan David Blake, Overijse (BE); Patrick Jean-François Etesse, Brussels (BE); Gates Markham Moss, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/093,291

(22) Filed: Mar. 7, 2002

(65) Prior Publication Data

US 2002/0153345 A1 Oct. 24, 2002

Related U.S. Application Data

(63) Continuation of application No. PCT/IB00/01188, filed on Aug. 28, 2000.

(30) Foreign Application Priority Data

Sep. 10, 1999 (EP) ............................................. 99870180

(51) Int. Cl.[7] .............................................. B65D 23/10
(52) U.S. Cl. ....................... 215/398; 215/12.1; 215/384
(58) Field of Search ................................. 206/459, 497; 215/12.1, 383, 384, 398, 12.2; 220/771

(56) References Cited

U.S. PATENT DOCUMENTS

| 4,051,265 A | * | 9/1977 | Kirshenbaum et al. | . 215/398 X |
|---|---|---|---|---|
| 4,257,525 A | | 3/1981 | Thompson | |
| 4,368,827 A | | 1/1983 | Thompson | |
| 4,629,598 A | | 12/1986 | Thompson | |
| 5,122,399 A | * | 6/1992 | Farrell et al. | ........... 215/384 X |
| 5,383,558 A | * | 1/1995 | Wilkinson et al. | ...... 215/398 X |
| 5,524,787 A | | 6/1996 | Blake et al. | |
| 5,676,314 A | * | 10/1997 | Brass et al. | ............. 222/401 X |
| 5,711,061 A | | 1/1998 | Blake et al. | |
| 5,836,469 A | * | 11/1998 | Zebrowski | .............. 215/398 X |
| 2002/0124931 A1 | | 9/2002 | Etesse | |

FOREIGN PATENT DOCUMENTS

| CN | 1023099 C | | 12/1993 | |
|---|---|---|---|---|
| EP | 0 483 976 A1 | | 5/1992 | |
| EP | 0 609 575 A1 | | 8/1994 | |
| EP | 0 609 644 A1 | | 8/1994 | |
| EP | 0 785 146 A2 | | 7/1997 | |
| EP | 1 083 041 A1 | | 3/2001 | |
| EP | 1 083 129 A1 | | 3/2001 | |
| EP | 1 176 100 A1 | | 1/2002 | |
| JP | 56695 | * | 5/1977 | ................. 206/497 |
| JP | 52-56695 | | 5/1977 | |
| WO | WO 01/19692 A1 | | 3/2001 | |

\* cited by examiner

*Primary Examiner*—Sue A. Weaver
(74) *Attorney, Agent, or Firm*—Jeffrey V. Bamber

(57) ABSTRACT

A shrink-sleeved bottle is disclosed. The bottle has a base, a top part and sides. The bottle has a handle located on a side of the bottle and a sleeve that covers the handle. The sleeve has a cut-out that allows a user to grip the handle, and a fringe that is maintained flush against the bottle.

6 Claims, 2 Drawing Sheets

SHRINK SLEEVED BOTTLE

This application is a continuation of PCT Patent Application No. IB00/01188, filed Aug. 28, 2000, which claims the benefit of the filing date of European Patent Application No. 99870180.9, filed Sep. 10, 1999.

TECHNICAL FIELD

The invention relates to packages such as bottles used for containing fluids.

BACKGROUND OF THE INVENTION

Bottles are widely used in consumer goods industry for packaging various type of fluid products. Such bottles are normally decorated, often using labels which are stuck onto the bottle. Such labels are typically used not only for decoration but also to display usage instructions or information on the composition of the content for example. However, conventional labelling technology such as wet glue labels, self-adhesive labels, or in mold labels do not allow to decorate the full bottle surface area. The accumulation of such visual signals led the industry to develop new approaches allowing higher decoration coverage of the container's surface, one of them being the shrink-sleeving of packages.

Shrink-sleeving is mostly used in the drinking industry, whereby a sleeve of thermo-plastic material may be shrinked all around a beverage bottle, thus offering an extended area which may be used for any type of graphics. Typical thermoplastic materials used for shrink sleeving include polyvinylchloride (PVC), polyestertetraphtalate (PET), oriented polypropylene (OPP) and oriented polystyrene (OPS).

However, use of shrink-sleeving did not extend to relatively larger containers, particularly because of the need of a side handle when such containers are used. Indeed, the sleeving of a bottle consists in inserting the bottle into a straight sleeve of thermo-plastic material, the thermo-plastic being then heated up to shrink and fit tightly around the container. Clearly, in case of a container or bottle having a side handle, such a process would lead to preventing access to the handle as the sleeve would cover the recess produced by the handle, so that the handle cannot be gripped.

The invention seeks to provide a bottle with a side handle, whereby the surface available for displaying graphics onto the bottle is maximised.

SUMMARY OF THE INVENTION

In accordance with the invention, this object is accomplished in a bottle having a base, a top part and sides, the bottle comprising a handle located on a side of the bottle, the bottle being shrink-sleeved, whereby the sleeve covers the handle, the sleeve comprising a cut-out allowing to grip the handle, the cut-out having a fringe maintained flush against the bottle.

BRIEF DESCRIPTION OF THE DRAWINGS

The invention will now be described by way of example and with reference to the accompanying drawing in which.

DETAILED DESCRIPTION OF THE INVENTION

The invention relates to a decorated bottle where the means of decoration is a shrink sleeve. The term bottle hereby should be understood generally as a container for fluid products, fluid products including liquids as well as flowing materials such as powders or granule.

The bottle has a base. By a base it should be understood a part of the bottle on which the bottle is left to stand up-right. This part my be flat, on may for example be formed from a moulded tripod, or from a flat ring. Many types of "base" are know in the art, the main feature of such a base being to hold the bottle in a stable position on a flat supporting surface.

The bottle further comprises a top part. The top part is typically the part of the bottle opposed to the base. The top is commonly the part of the bottle which provides an exit for the content of the bottle.

The bottle also comprises sides. The sides are the surfaces which generally speaking are joining the top and the base of the bottle. Typically, when the bottle is upright, the sides are substantially vertical and perpendicular to the base. The sides may also have a curved or relatively complex shape depending on the bottle considered.

The bottle comprises a handle located on a side of the bottle. This makes the bottle different from bottles without handles (such as for example bottles for soda or beer portions), and also from bottle with a handle on the top part (such as "heavy" bottles of the type used for containing more than 5 liters of petrol for example). The handle according to the invention is normally forming a recess in the vertical direction when the bottle is upright, the recess being such that a user may slide the hand in the recess to hold the bottle by the handle.

Further, the bottle is shrink-sleeved. Shrink sleeving consists in enveloping a part of the bottle in a thermoplastic tube like sleeve, the sleeve being heated to shrink and fit onto the bottle.

The sleeve also comprises a cut-out allowing to grip the handle. This cut out is typically in two parts facing each other on each side of the recess produced by the handle, thus allowing for access of the hand of a user. Therefore, each of the two parts of the cut out should typically have a size corresponding to the size of the recess.

Further, the cut-out according to the invention has a fringe maintained flush against the bottle. This is to avoid to have the fringe of the cut out to hang loose in the recess area. Indeed, this would be incommode for a user, or even dangerous if such fringe has sharp edges.

Figure 1:
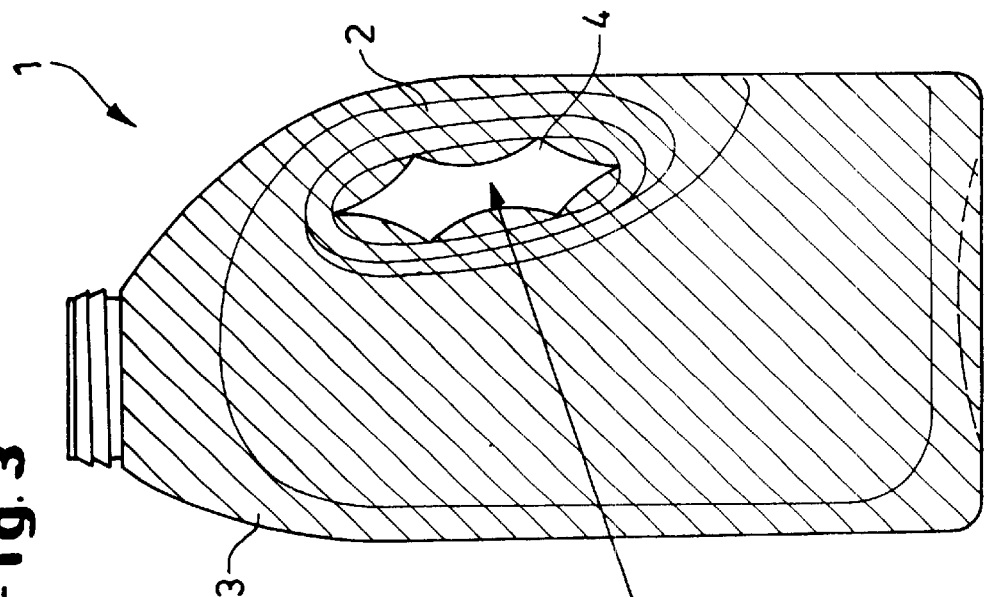
FIG. 1 is a side view illustrating a bottle (1) according to the invention with a handle (2) and a sleeve (3) (in hatched on the Figures). The sleeve has a cut out with fringes (4). The bottle is illustrated after sleeving and prior to the insertion of an insert.
Figure 2:
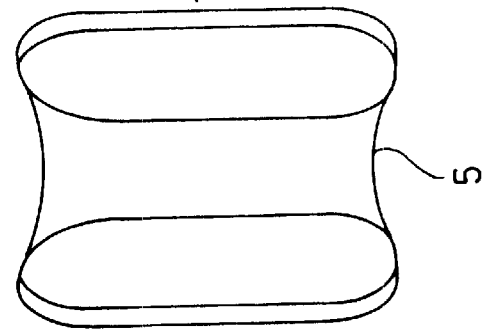
FIG. 2 is a plan view illustrating an insert (5) which may be used with the sleeved bottle of FIG. 1 by inserting it as indicated with the arrows.
Figure 3:
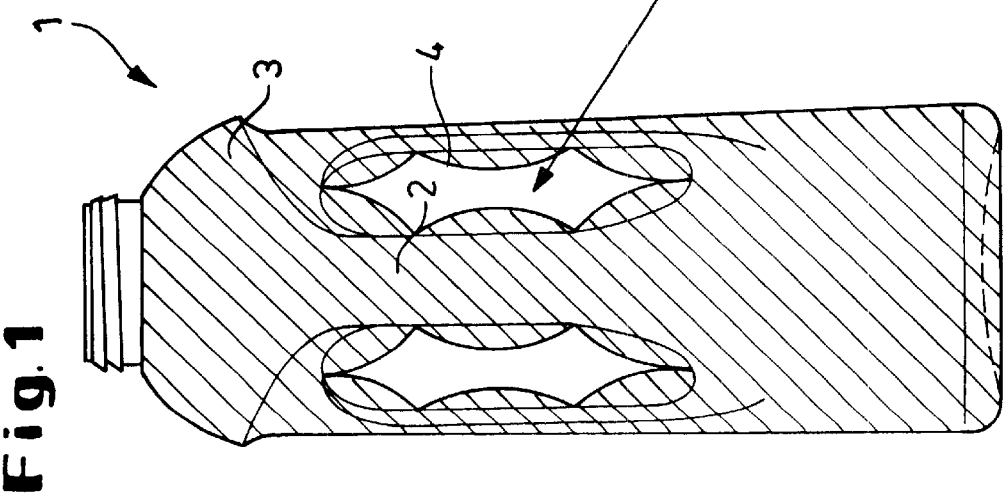
FIG. 3 is a front view of the bottle of FIG. 1.
Figure 4:
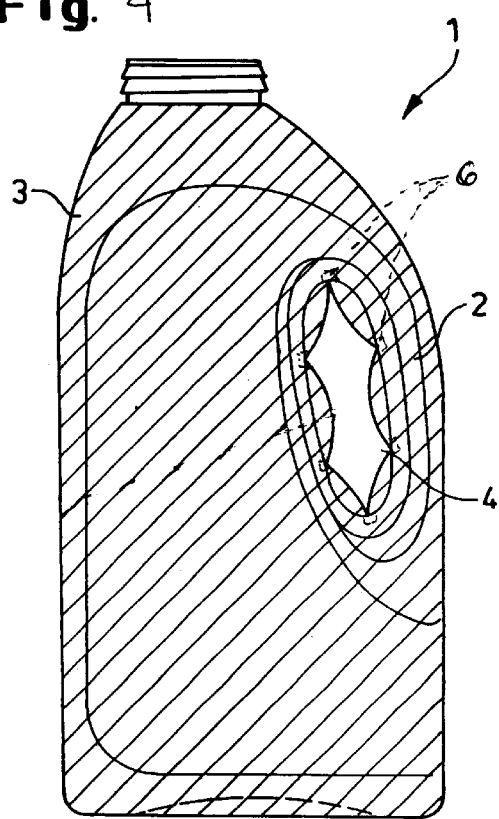
FIG. 4 is a front view of a bottle having the fringe formed by the cut-out portion of the sleeve maintained in contact with at least a portion of the bottle by an adhesive.

Such a result may be obtained in various ways:

In a first embodiment shown in FIG. 4, the cut-out is maintained flush against the bottle by means of an adhesive 6, the adhesive 6 typically maintaining the fringe of the cut-out in contact with the side of the bottle or with the handle surface, thus preventing parts of the fringe from hanging loose.

Figure 5:
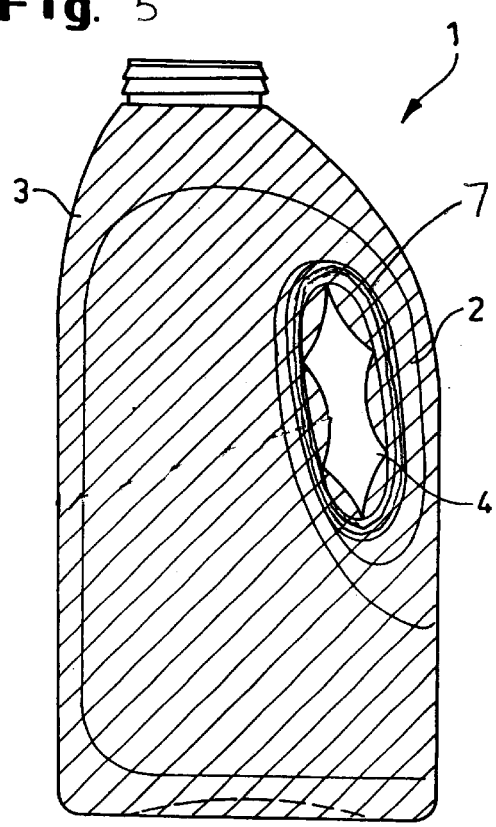
FIG. 5 is a front view of a bottle having the fringe formed by the cut-out portion of the sleeve maintained in contact with at least a portion of the bottle by two grooves circumscribing the handle area.

In another embodiment, shown in FIG. 5, the cut-out is maintained flush against the bottle by means of two grooves 7, one on each side of the handle, the grooves 7 circumscribing the handle area. The grooves 7 typically border the fringe of the cut-out, thus preventing parts of the fringe from hanging loose.

In another embodiment, the cut-out is maintained flush against the bottle by means of an insert. Such insert should be located into the recess formed by the handle, and should cover the fringe of the cut out. An extra advantage of such an insert may be to reinforce the mechanical structure of the bottle, which may be particularly desirable in the region of the handle.

In the preferred embodiments, the sleeve covers at least 30% of the outer surface of the bottle, in order to provide for a sufficient surface to application of graphics. More preferably, the sleeve covers at least 50% of the outer surface of the bottle, even more preferably 65%, and most preferably at least 80% of the outer surface of the bottle. It should be understood the "outer surface of the bottle" hereby comprises the whole outer surface, including the outer surface of the base, or of the handle for example.

In the preferred embodiments, the bottle has an internal volume of at least 1 liter and of less than 5 liters. Even more preferably, the bottle has an internal volume of less than 3 liters. Indeed, a handle would not be particularly needed for smaller bottles, and a side handle would be preferably replaced by a top handle for larger bottles.

What is claimed is:

1. A bottle having a base, a top part and sides, the bottle comprising a handle located on a side of the bottle, the bottle being shrink-sleeved, whereby the sleeve covers the handle, the sleeve comprising a cut-out allowing to grip the handle, the cut-out having a fringe maintained flush against the bottle by securing at least a portion of said fringe to at least a portion of the bottle.

2. The bottle according to claim 1, whereby the sleeve covers at least 30% of the outer surface of the bottle.

3. The bottle of claim 1 wherein the bottle has an internal volume of at least 1 liter and of less than 5 liters.

4. A bottle having a base, a top part and sides, the bottle comprising a handle located on a side of the bottle, the bottle being shrink-sleeved, whereby the sleeve covers the handle, the sleeve comprising a cut-out allowing to grip the handle, the cut-out having a fringe maintained flush against the bottle by an adhesive.

5. A battle having a base, a top part and sides, the bottle comprising a handle located on a side of the bottle, the bottle being shrink-sleeved, whereby the sleeve covers the handle, the sleeve comprising a cut-out allowing to grip the handle, the cut-out having a fringe maintained flush against the bottle by an insert.

6. A bottle having a base, a top part and sides, the bottle comprising a handle located on a side of the bottle, the bottle being shrink-sleeved, whereby the sleeve covers the handle, the sleeve comprising a cut-out allowing to grip the handle, the cut-out having a fringe maintained flush against the bottle by two grooves circumscribing the handle area, one on each side of the handle.

* * * * *